(12) United States Patent
Shigehisa et al.

(10) Patent No.: US 7,320,715 B2
(45) Date of Patent: Jan. 22, 2008

(54) METHOD FOR DRYING PLANT-DERIVED BIOMASS AND METHOD FOR PRODUCING BIOMASS FUEL

(75) Inventors: Takuo Shigehisa, Takasago (JP); Masaaki Tamura, Takasago (JP); Yutaka Mitou, Takasago (JP); Tetsuya Deguchi, Takasago (JP); Satoru Sugita, Takasago (JP)

(73) Assignee: Kabushiki Kaisha Kobe Seiko Sho (Kobe Steel, Ltd.), Kobe (JP)

( * ) Notice: Subject to any disclaimer, the term of this patent is extended or adjusted under 35 U.S.C. 154(b) by 587 days.

(21) Appl. No.: 10/734,482

(22) Filed: Dec. 15, 2003

(65) Prior Publication Data

US 2004/0123519 A1 Jul. 1, 2004

(30) Foreign Application Priority Data

Dec. 18, 2002 (JP) ............................. 2002-366686
Jul. 15, 2003 (JP) ............................. 2003-274479

(51) Int. Cl.
*C10L 5/00* (2006.01)
*C10L 5/40* (2006.01)

(52) U.S. Cl. ............................. 44/605; 44/589; 44/504

(58) Field of Classification Search ................ 44/589, 44/605, 307, 504
See application file for complete search history.

(56) References Cited

U.S. PATENT DOCUMENTS 4,959,154 A 9/1990 Simmons
5,244,472 A 9/1993 Simmons
6,217,939 B1 * 4/2001 Sailer et al. ................ 427/325
6,818,027 B2 * 11/2004 Murcia ........................ 44/550

FOREIGN PATENT DOCUMENTS

| JP | 57-78492 | 5/1982 |
|---|---|---|
| JP | 57-207697 | 12/1982 |
| JP | 60-262891 | 12/1985 |
| JP | 63-165490 | 7/1988 |
| JP | 5-138197 | 6/1993 |
| JP | 7-278581 | 10/1995 |

* cited by examiner

*Primary Examiner*—Cephia D. Toomer
(74) *Attorney, Agent, or Firm*—Oblon, Spivak, McClelland, Maier & Neustadt, P.C.

(57) ABSTRACT

Disclosed herein is an economical method for efficiently drying the plant-derived biomass for which there has been no established method for disposal and reuse. This drying method does not impair the value of plant-derived biomass as a fuel. Disclosed also herein is a method for producing a biomass fuel from the plant-derived biomass which has been dried by the aforesaid method.

The drying method consists of dehydrating (drying) plant-derived biomass in oil with heating and modifying it simultaneously. Drying in this way partly decomposes the plant-derived biomass, thereby yielding a good constituent for biomass fuel.

15 Claims, 5 Drawing Sheets

METHOD FOR DRYING PLANT-DERIVED BIOMASS AND METHOD FOR PRODUCING BIOMASS FUEL

BACKGROUND OF THE INVENTION

1. Field of the Invention

The present invention relates to a method for drying plant-derived biomass in an extremely economical way, and also to a method for producing biomass fuel by using said drying method.

2. Description of the Prior Art

The term "biomass" has been defined originally as "the amount of living matter" in the field of biology. At present, however, it is used in a broader sense to imply foods, materials, and fuels composed of substances originating from organisms.

Although biomass includes those such as rice bran and charcoal which are in routine use, it also includes increasing industrial wastes whose disposal is under study. Wastes from agriculture include coconut husks and rice hulls; wastes from forestry include wood chip dust and pruned branches; wastes from animal husbandry include fecal matter; and wastes from fishery include internal organs and bones remaining after processing. Food wastes and sewage sludge are also regarded as biomass, and the way of their disposal is not yet established.

It is essential that the biomass mentioned above should be disposed of at a low cost. A desirable way to dispose of biomass is to reuse biomass as fuel. Unfortunately, biomass contains a large amount water and hence needs to be freed of water (or dried) before its reuse. At present, however, the drying step is so expensive as to make reuse impracticable.

No. 1. Japanese Patent Laid-open No. 139574/1975 (page 1)

No. 2. Japanese Patent Laid-open No. 165490/1988 (claim 1 and others)

No. 3. Japanese Patent Publication No. 41268/1995 (claim 1 and others)

No. 4. U.S. Pat. No. 4,959,154 (page 2, right column, lines 30-36)

No. 5. U.S. Pat. No. 5,244,472 (claim 1 and others)

No. 6. Japanese Patent Publication No. 44718/1983 (page 1)

No. 7. Japanese Patent Laid-open No. 262891/1985 (claim 1 and others)

No. 8. Japanese Patent Publication No. 15560/1989 (claim 1 and others)

No. 9. Japanese Patent Laid-open No. 278581/1995 (claim 1 and others)

Some methods for drying sewage sludge as biomass are disclosed in the patent literature Nos. 1 to 3. Despite their respective features, they involve in common a step of heating sewage sludge in oil under reduced pressure or atmospheric pressure, thereby reducing thermal energy required for drying.

As for disposal of biomass other than sewage sludge, a method for drying wood chips used to clean up oil spill is disclosed in the patent literature No. 4. This method involves a step of keeping wood chips in oil at 121-177° C. for 3-12 minutes. A method of heating and drying wood chips in oil at 163-191° C. is also disclosed in the patent literature No. 5.

These drying methods, however, are not satisfactory when considered from the standpoint of reusing the dried biomass. In other words, heating biomass in oil under reduced pressure or atmospheric pressure surely achieves drying, but the resulting dried biomass as such does not serve as fuel, because plant-derived biomass is difficult to crush into small pieces due to its high content of fibrous components (such as cellulose) and is unsuitable for transportation due to its bulkiness. On the other hand, plant-derived biomass may possibly be mixed with coal or any other fuel; however, it will greatly impair the strength of fuel because it is not easily pulverized. Even if dried biomass in pulverized form is to be added to fuel, its amount is limited because simply dried biomass produces no binding effect.

Another conceivable way to eliminate the disadvantage of plant-derived biomass involving difficulties in pulverization due to fibrous materials is by heating in oil under conditions severe enough to bring about drying as well as decomposition. Plant-derived biomass such as food wastes and wood chips, which are composed mainly of cellulose, hemicellulose, and lignin, is decomposed into low-molecular substances (such as monosaccharide and monolignol) upon heating in oil at high temperatures under high pressures. Such decomposition products are not suitable as fuel constituents because of poor combustibility and high water solubility (which makes separation from water extremely difficult).

Meanwhile, fuels composed of wood powder and low-grade coal mixed together are disclosed in the patent literature Nos. 6 to 8. These fuels use wood powder as a binder, which leads to the advantage of having adequate strength and emitting less soot and smoke upon combustion.

The technologies disclosed in the patent literature Nos. 6 to 8, however, have completely overlooked the problem with drying biomass (wood powder). The technology disclosed in the patent literature No. 6 even proposes treatment with steam to impart binder activity to wood powder. Therefore, the fuel proposed in the patent literature Nos. 6 to 8 would be poor in combustion heat due to moisture contained therein.

The patent literature No. 9 discloses a technology of making solid fuel from residues of animals and plants by drying. This technology, however, completely overlooks the necessity of reducing the volume of plant-derived biomass.

As mentioned above, there have been several known methods for drying biomass. However, they are not necessarily suitable for application to plant-derived biomass from the standpoint of reusing biomass after drying. Moreover, they involve problems with recovery of oil used for drying and they are unable to process a large amount of bulky biomass. Fuel containing plant-derived biomass is known, but it is uneconomical, impracticable, and unsatisfactory because there has been no effective method for drying plant-derived biomass.

OBJECT AND SUMMARY OF THE INVENTION

The present invention was completed to address the above-mentioned problems. Thus, it is an object of the present invention to provide a method for drying plant-derived biomass in an extremely economical way, and also to provide a method for producing biomass fuel from plant-derived biomass dried by said drying method. The drying method according to the present invention permits easy oil recovery and retains the value of plant-derived biomass as fuel.

In order to tackle the above-mentioned problems, the present inventors carried out a series of researches from the standpoint of economically drying plant-derived biomass by heating in oil. As the result, it was found that the problems can be solved if the drying by heating in oil is accompanied by a prescribed treatment. The present invention is based on these findings.

The present invention is directed to a method for drying plant-derived biomass, said method comprising:

(a) a step of grinding plant-derived biomass, (b) a step of treating the ground product of biomass in oil at 120-300° C. under a pressure which is higher than the vapor pressure of said oil at said temperature, and (c) a step of drying the ground product of biomass in oil at 120-200° C., with the sequence of steps (b) and (c) being arbitrary.

Step (b) partly decomposes the biomass being treated, giving rise to treated biomass suitable for fuel without impairing the characteristic properties required of fuel component. Therefore, the method according to the present invention permits efficient and economical treatment for reuse of biomass.

According to the drying method mentioned above, step (b) should preferably precede step (c), because step (b) decreases the volume of biomass being treated, thereby permitting step (c) to dry a large amount of biomass.

Step (a) to grind plant-derived biomass should preferably be carried out in oil. In this way it is possible to eliminate the step of mixing in oil after grinding and to send the ground product to the subsequent step through a pipeline. In other words, step (a) permits efficient and continuous drying in place of batchwise drying.

The ground product of plant-derived biomass should preferably have an average particle size of 1-5 mm, so that it can be partly decomposed (on the molecular level) in the subsequent step (for heating under pressure) with a less amount of energy without loss in fluidity.

In the drying step mentioned above, it is desirable that the ratio of the amount of the ground product of biomass to the amount of the oil should be from 10:20 to 10:50 (by weight). An unnecessarily excess amount of oil should be avoided for economical reason. However, an adequate amount of oil is necessary to ensure the fluidity of the mixture that permits continuous operation through a pipeline.

Step (c) for drying the plant-derived biomass which has been treated in the preceding steps should preferably be so carried out as to recover and reuse the latent heat of evaporation of water vapor evolved. This saves heat energy and economizes the entire process.

The present invention is directed also to a method for producing biomass fuel, said method comprising:

(d) a step of grinding plant-derived biomass, (e) a step of producing a coal slurry from oil and coal, (f) a step of mixing the ground product of biomass with the coal slurry, (g) a step of treating the ground product of biomass or the mixture in oil at 120-300° C. under a pressure which is higher than the vapor pressure of said oil at said temperature, and (h) a step of drying the ground product of biomass or the mixture in oil at 120-200° C., with the sequence of steps (f) to (h) being arbitrary.

This method, which utilizes the above-mentioned drying method of the present invention, permits the economical production of a biomass fuel containing as much biomass as possible to eliminate the disadvantage of biomass in having low combustion heat. On the other hand, the biomass fuel obtained by this method has the advantage in being easily ignited (which is inherent in biomass fuel). This method may utilize the drying method of the present invention in its preferred embodiment.

The coal used in this method may be low-grade coal. Upon heating in oil, low-grade coal is freed of water economically. In addition, low-grade coal in slurry form has no possibility of spontaneous ignition during storage and transportation. This leads to efficient and economical use of inexpensive low-grade coal.

The present invention is also directed to a method for producing biomass fuel, said method comprising:

(i) a step of grinding plant-derived biomass, (j) a step of treating the ground product of biomass in oil at 120-300° C. under a pressure which is higher than the vapor pressure of said oil at said temperature, (k) a step of adding a gasifying catalyst to the ground product of biomass; and (l) a step of drying the ground product of biomass in oil at 120-200° C., with the sequence of steps (j) to (l) being arbitrary so long as step (k) precedes step (l).

This method utilizes the above-mentioned drying method of the present invention in its preferred embodiment. The biomass fuel obtained by this method is characterized in that the gasifying catalyst penetrates into interstices in biomass so as to provide a large area of contact with biomass. Thus, the catalyst gasifies the biomass fuel more efficiently than the conventional supported catalyst. The resulting biomass fuel, therefore, is suitable for gasified combustion.

The present invention is also directed to a method for producing biomass fuel, said method comprising:

(m) a step of grinding plant-derived biomass, (n) a step of treating the ground product of biomass in oil at 120-300° C. under a pressure which is higher than the vapor pressure of said oil at said temperature, and (o) a step of drying the ground product of biomass in oil at 120-200° C., with the sequence of steps (n) and (o) being arbitrary.

The biomass fuel produced by this method is composed of carbon-neutral biomass and heavy oil (or super heavy oil) which is commonly used for thermal power generation. It ignites easily. It also helps cope with global warming.

The method just mentioned above may involve an additional step of adding a gasifying catalyst, which should preferably precede step (o). This modified method gives rise to the same biomass fuel as the original method. The catalyst added in this method efficiently gasifies both biomass and heavy oil, thereby producing a good fuel gas.

DESCRIPTION OF THE PREFERRED EMBODIMENTS

The method for drying plant-derived biomass according to the present invention is characterized by a significant saving in operating cost and also by its ability to keep the value of plant-derived biomass as fuel.

According to a conventional method, plant-derived biomass is dried by means of oil. This conventional method suffers an economical disadvantage due to low yields of oil recovery. Moreover, the resulting dried biomass cannot be used as a fuel component because it is composed of bulky fibrous materials or because it has its constituent (cellulose) decomposed to low-molecular-weight compounds, thereby losing the inherent merit of plant-derived biomass as fuel. The present inventors found that these problems can be solved if heating in oil (as a conventional drying method) is modified by an additional step. The present invention is based on these findings.

The present invention and its effect will be described below with reference to its embodiments.

Figure 1:
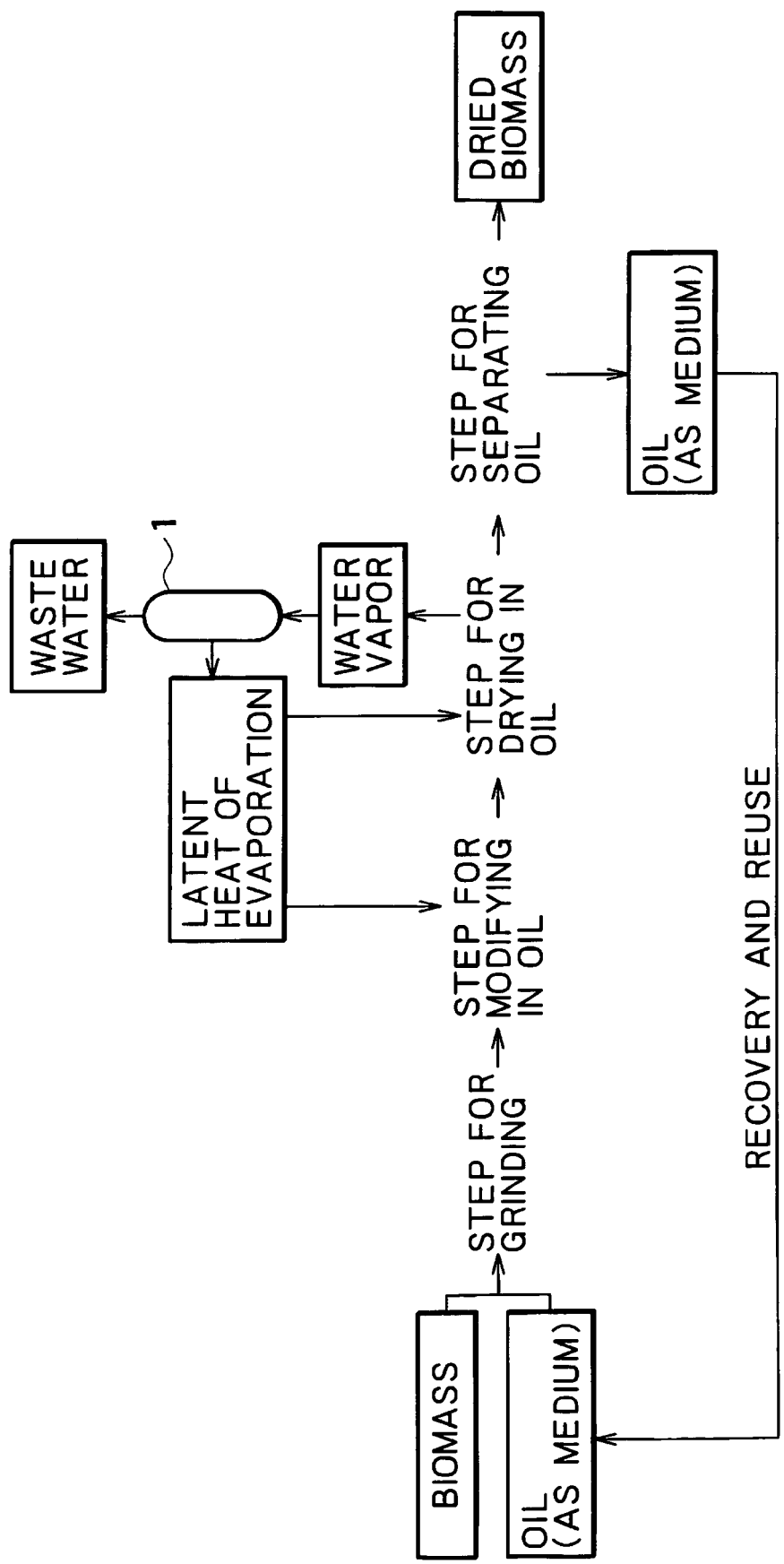
FIG. 1 is a flow sheet showing the method of drying plant-derived biomass in a preferred embodiment of the present invention.

According to the present invention, the method for drying plant-derived biomass comprises (1) a step of grinding plant-derived biomass, (2) a step of treating the ground product of biomass in oil at 120-300° C. under a pressure which is higher than the vapor pressure of said oil at said temperature, and (3) a step of drying the ground product of biomass in oil at 120-200° C. The flow sheet of this method is shown in FIG. 1.

The first step of "grinding plant-derived biomass" is intended to help efficient drying.

The term "plant-derived biomass" refers to biomass composed mainly of cellulose, hemicellulose, and lignin. "Cellulose" is defined as "β-D-1,4-glucan which is distributed in all plants (excluding special ones), some bacteria, and some animals". "Hemicellulose" is defined as "water-insoluble alkali-soluble polysaccharides (excluding cellulose and pectin) existing in the cell wall of land plants". "Lignin" is defined as "amorphous polymeric substance existing in the cell wall of vascular bundle of plants". See pages 1275, 2147, and 2460, respectively, in "Kagaku Daijiten", 1st edition, compiled by Michinori Ouki et al., issued by Tokyo Kagaku Doujin, Oct. 20, 1989 (general technical literature). According to these definitions, the plant-derived biomass used in the present invention include coconut husks, sugar cane bagasse, straw, and rice hulls (as by-products of agriculture); chip dust, saw dust, wood shavings, and pruned branches (as by-products of forestry); and food waste. In fact, about 95% of coconuts is wasted in coconut oil production, and about 43% of sugar cane is wasted in sugar production. The present invention will be useful for the disposal of such waste materials.

Using "plant-derived biomass" as fuel offers the advantage of not increasing the emission of carbon dioxide. Coal, upon combustion, releases carbon dioxide gas to the atmosphere from the carbon which had been immobilized in ancient times. By contrast, carbon in plant-derived biomass is one which was immobilized while the plant (as the raw material of the biomass) was growing. Therefore, plant-derived biomass does not substantially increase carbon dioxide in the air after its combustion within a certain period of time. For this reason, "plant-derived biomass" is referred to as a source of carbon-neutral fuel. It should be positively used as fuel, with global warming taken into consideration.

"Grinding" of plant-derived biomass should preferably be carried out in oil. Although it is possible to add separately ground biomass into oil, grinding in oil is desirable because the ground product in slurry form permits transportation through a pipe line and continuous treatment in large quantities. "Grinding" is accomplished typically by coarse grinding (by a roll crusher or the like) and subsequent grinding in oil by a Sand grinder.

The ground product thus obtained should preferably have an average particle size of 1-5 mm. It is not necessary to grind the biomass finer than the lower limit because the ground product is partly decomposed into molecules in the subsequent step. On the other hand, coarse particles larger than 5 mm present difficulties in transportation through a pipe line.

The average particle size may be measured by any known method without specific restrictions. A typical measuring method is illustrated below. A sample of biomass which has been ground in oil is thoroughly mixed. A portion of the mixed sample is diluted 10 times in oil. The resulting dispersion is filtered through a filter paper (larger than 10 cm in diameter) such that the small pieces of ground biomass do not overlap as far as possible. The remains on the filter paper are photographed. The length of each piece is measured. More than 100 measurements should preferably be made. If 95% of the total measurements is within the range of 1-5 mm, the sample is regarded as having the specified average particle size. Excessively large or small particles are acceptable so long as their number is limited.

The ratio of the amount of the ground product of biomass to the amount of the oil should preferably be from 10:20 to 10:50 by weight. An unnecessarily excess amount of oil should be avoided for economical reason. However, an adequate amount of oil is necessary to ensure the fluidity of the mixture that permits continuous operation through a pipe line. This requirement is also applicable to the subsequent steps (2) and (3).

The "oil" in which grinding is carried out is not specifically restricted; it includes gas oil, kerosene, and lubricant (all derived from petroleum). The one having an initial boiling point higher than 150° C. and a 95% recovery temperature lower than 300° C. is preferable. The dried biomass is freed of oil by mechanical means and then by heating. The former step is intended to save thermal energy in the latter step. Incidentally, the "oil" may be incorporated with heavy oil such as bitumen.

The second step of "treating the ground product of biomass in oil at 120-300° C. under a pressure which is higher than the vapor pressure of said oil at said temperature" is intended to decompose the plant-derived biomass only partly. In other words, it is intended to decompose only hemicellulose (which is more subject to decomposition) while keeping intact cellulose and lignin as major constituents. The result of the second step is that the biomass decreases in volume, while keeping the characteristic of fuel (or good ignitability), and permits easy oil separation. The thus treated biomass is readily added to coal and other fuels.

The second step is required to meet two conditions—"at 120-300° C." and "under a pressure which is higher than the vapor pressure of said oil at said temperature". These conditions are imposed so that the treatment in oil decomposes mainly hemicellulose only. Treatment at a temperature below 120° C. does not proceed rapidly, and treatment at a temperature higher than 300° C. will also decompose cellulose. The treatment temperature should preferably be higher than 140° C., higher than 160° C., higher than 180° C., or higher than 200° C., and lower than 290° C., lower than 280° C., or lower than 270° C.

Also, the condition of "higher than the vapor pressure of said oil at said temperature" is imposed so that the treatment in oil hydrolyzes hemicellulose with heating under pressure while preventing evaporation of oil. The upper limit of the pressure is not specifically restricted; however, it should preferably be "lower than 5 MPa" from the standpoint of facility investment. The pressure should preferably be lower than 4 MPa, lower than 3 MPa, lower than 2 MPa, or lower than 1 MPa, so long as it is higher than the vapor pressure of the oil. In the case where the second step is carried out before the third step for drying (mentioned later), it is desirable that the pressure be higher than the water vapor pressure at the drying temperature. This condition is necessary to carry out the partial decomposition efficiently by keeping and utilizing water contained in the biomass itself without adding water.

The second step should preferably be carried out for 10-90 minutes. Treatment shorter than 10 minutes does not completely decompose hemicellulose; treatment longer than 90 minutes decomposes cellulose as well as hemicellulose. The duration of treatment should preferably be longer than 20 minutes, longer than 40 minutes, and shorter than 80 minutes. The optimal duration is about 1 hour.

The second step produces its effect when the "plant-derived biomass" is used as fuel. In other words, if the dried "plant-derived biomass" is added as such to coal, the resulting fuel has low strength and causes clogging in the feed pipe to the burner at the time of combustion. This problem is avoided by the treatment in the second step which adequately grinds the biomass while keeping its characteristics of fuel component.

The heating vessel used for the second step is not specifically restricted. It includes, for example, batch-wise reactor, complete mixing reactor, and extrusion flow reactor.

The effect of partial decomposition in the second step is that the amount of oil remaining in interstices in the biomass decreases in the drying step (the third step) mentioned later which releases moisture from interstices in the biomass and causes oil to infiltrate into them. This effect reduces the loss of oil in the entire process.

The third step of "drying the ground product of biomass in oil at 120-200° C." is intended to dry the biomass.

This drying step may be carried out under any pressure which is not specifically restricted so long as it is lower than the saturated vapor pressure which depends on the drying temperature. Efficient drying is possible under reduced pressure or normal pressure. A pressure lower than the saturated vapor pressure is favorable to actual operation because such a low pressure permits the compressor to run under a light load when it pressurizes water vapor to reuse latent heat of evaporation. (This will be mentioned later.)

It is desirable to recover and reuse the latent heat of evaporation of water vapor evolved in the third step. In other words, water vapor evolved is pressurized to generate the latent heat of evaporation, which is used for heating in the second step or the third step. This improves energy efficiency in the total process and reduces the running cost.

After drying, oil is removed by centrifugation, compression, or flashing. This procedure may be followed by heating to distill away residual oil. The thus recovered oil is reused to save running cost.

The order of the second step and the third step does not matter; however, it is desirable to carry out the second step first. The second step reduces the volume of the plant-derived biomass being treated, thereby permitting the thirst step to be carried out easily. Moreover, the second step partly decomposes the biomass, thereby permitting the biomass to be dried efficiently.

After drying, the plant-derived biomass can be used as a constituent of fuel. The dried biomass is limited in the amount of heat of combustion but is readily ignited. In addition, it is carbon-neutral and hence prevents the increase of carbon dioxide in the atmosphere. The present invention makes it possible to efficiently reuse the biomass which hitherto had to be disposed of or discarded in an expensive way only because there was no adequate drying method.

Figure 2:
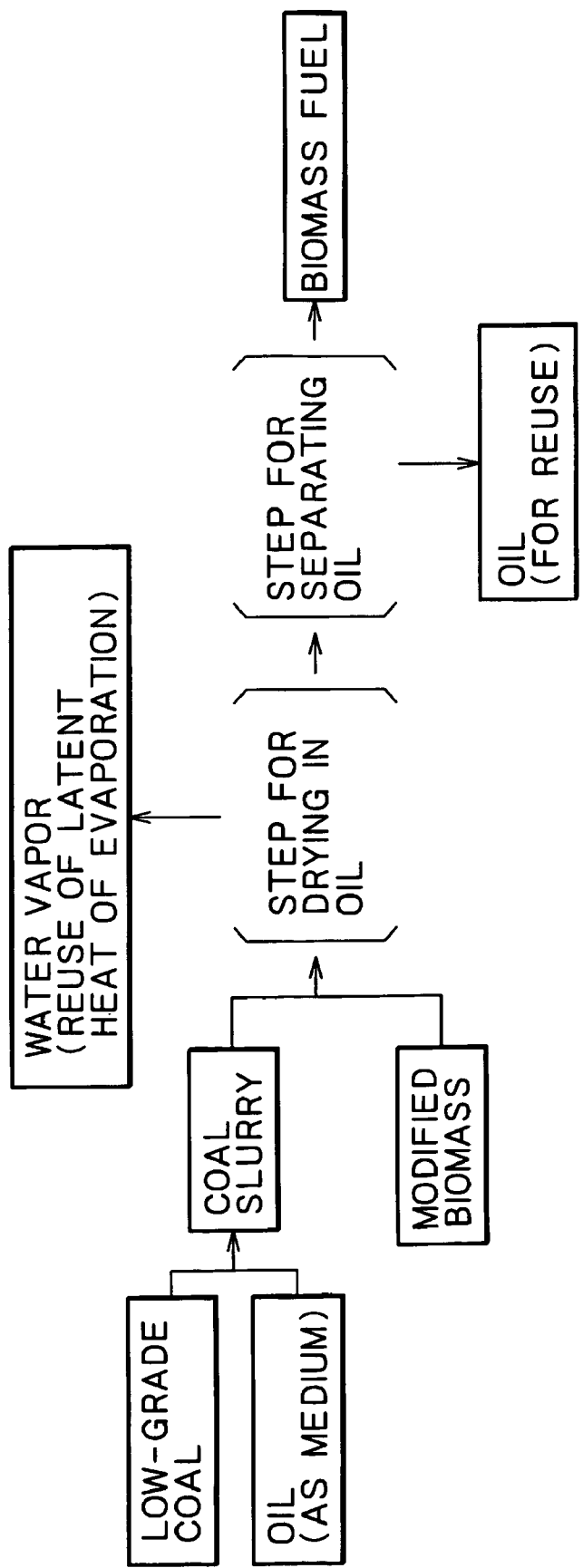
FIG. 2 is a flow sheet showing the first method of producing biomass fuel according to the present invention.

The first process for producing the biomass fuel mentioned above is explained below with reference to the flow sheet shown in FIG. 2.

The process starts with preparing a coal slurry from oil and coal. (The fourth step of preparing a coal slurry) This slurry permits transportation through a pipe line, thereby improving the efficiency of the entire process and also facilitating the mixing of the plant-derived biomass which has been dried.

The "coal" should preferably be so-called low-grade coal such as brown coal, lignite, and subbituminous coal (which are porous coal with a high water content). Low-grade coal is inexpensive due to high water content and hence contributes to cost reduction. Moreover, it can be dehydrated economically in the third drying step.

The "coal slurry" obtained by the fourth step (for preparation of coal slurry) is mixed with the treated biomass. (The fifth step for mixing) Mixing in this step is carried out until homogeneity is substantially achieved, so that the resulting fuel exhibits both the characteristic of biomass (easy ignition) and the characteristic of coal (constant and high heat production). The fact that the third step for drying is accomplished economically according to the present invention makes it possible to increase the amount of biomass to be added, which hitherto was limited due to high drying cost. The amount of biomass to be added should preferably be limited to 30 wt % of the total amount of the fuel because the biomass is small in the amount of heat of combustion.

The second, third, and fifth steps may be carried in any order. Any of the following orders is acceptable. (2)→(3)→(5), (3)→(2)→(5), (5)→(2)→(3), (5)→(3)→(2), (2)→(5)→(3), (3)→(5)→(2).

However, in the case where low-grade coal is used, the fifth step (for mixing) should precede the third step (for drying) because low-grade coal needs drying. The drying may be accomplished under the same conditions as used in the above-mentioned drying step.

In the drying step, heavy oil such as petroleum asphalt may be added. This heavy oil infiltrates into interstices in coal, thereby replacing water therein. The thus treated coal is relieved from spontaneous ignition during storage and transportation. It was found that heavy oil is caught selectively rather than gas oil and kerosene.

After drying, oil is separated and removed. The thus obtained biomass fuel exhibits both the characteristic of biomass (easy ignition) and the characteristic of coal (high energy). The conventional biomass fuel was limited in the amount of biomass on account of the cost required for drying biomass; however, according to the method of the present invention, it is possible to add biomass to such an extent that biomass does not impair the high energy density of the fuel.

Figure 3:
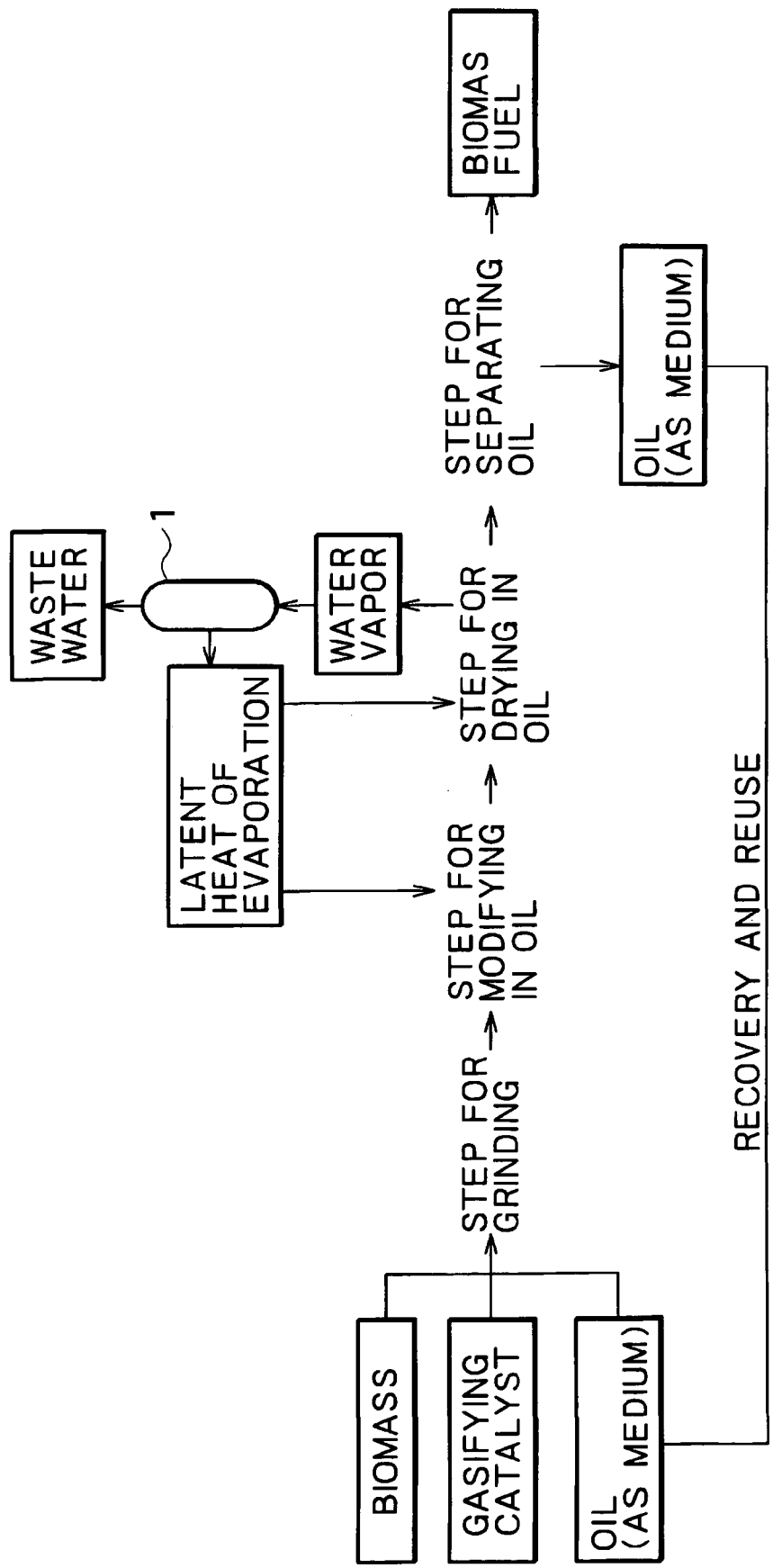
FIG. 3 is a flow sheet showing the second method of producing biomass fuel according to the present invention.

The third aspect of the present invention is concerned with a method of producing a gasifiable fuel. FIG. 3 shows the flow sheet of this method.

This method is identical with the drying method mentioned above except that it has an additional step of adding a gasifying catalyst. The addition of the gasifying catalyst may be placed in any stage before the drying step.

However, it is essential that the gasifying catalyst should be added before the drying step, because, in the drying step, water releases itself from interstices of biomass and the gasifying catalyst accompanied by oil infiltrates into them. The conventional process for gasifying biomass employs a supported catalyst; therefore, biomass leaves char and tar when it is gasified because the catalyst is not in close contact with biomass. The method of the present invention provides an excellent gasifiable fuel which can be gasified efficiently.

The gasifying catalyst used in the method of the present invention is not specifically restricted so long as it promotes the gasification of cellulose, hemicellulose, and lignin as the major constituents of plant-derived biomass. It includes, for example, Raney nickel, activated alumina, $Rh/CeO_2/SiO_2$ catalyst, and Fe catalyst.

Figure 4:
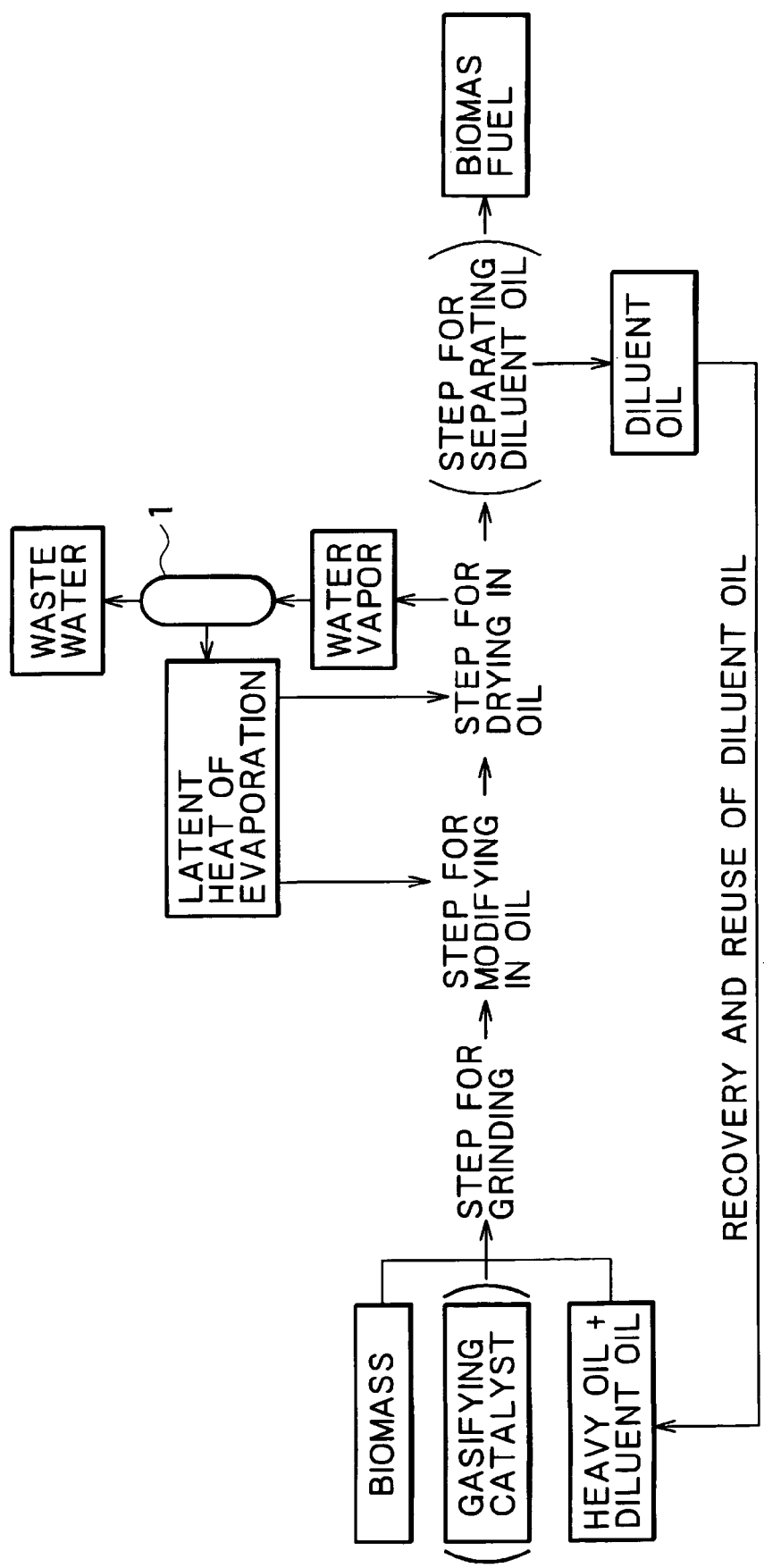
FIG. 4 is a flow sheet showing the third method of producing biomass fuel according to the present invention.

The third aspect of the present invention is concerned with a process for producing a heavy oil fuel containing biomass. FIG. 4 shows the flow sheet of this method.

This method differs from the above-mentioned process in that the step of drying plant-derived biomass employs heavy oil as "oil".

"Heavy oil" herein embraces heavy oil and super heavy oil, which are used in thermal power plants. According to this method, heavy oil is used directly as fuel without being isolated from biomass unlike the above-mentioned method for drying biomass or the above-mentioned method for producing biomass fuel. Biomass contained in the biomass fuel produced by this method does not impede the fluidity of fuel because it is in the ground state and it has hemicellulose therein chemically decomposed.

If the mixture of biomass and heavy oil is poor in productivity owing to its low fluidity, it may be mixed with a diluent such as gas oil, kerosene, and lubricant. The diluent may be recovered for reuse by selective distillation or it may be left as a constituent of the biomass fuel. Incidentally, the diluent is not specifically restricted but the one having an initial boiling point higher than 150° C. is preferable.

This method may have an additional step of adding a gasifying catalyst. The thus obtained biomass fuel evolves fuel gas in the gasifying step which gasifies both biomass and heavy oil. The resulting fuel gas is clean because biomass contains a less amount of sulfur than heavy oil.

The gasifying catalyst used in this method and the step of adding the gasifying catalyst in this method are identical with those in the second method of producing biomass fuel mentioned above.

According to the drying method of the present invention, plant-derived biomass is dried in such a way that the hemicellulose as the major constituent of biomass is selectively decomposed and biomass itself is dried economically. Thus, this method can finely grind biomass and hence can dispose of a large amount of biomass. The thus treated biomass can be added to fuel without loss of its characteristic properties required of fuel component.

The present invention permits the economical production of excellent biomass fuels and also permits the effective use of biomass incapable of being disposed of by the conventional method.

EXAMPLES

The invention will be described in more detail with reference to the following examples, which are not intended to restrict the scope thereof.

Example 1

A 5-liter autoclave was charged with 292 g of sawdust of New Zealand pine and 1785 g of kerosene. Then, the autoclave was charged with nitrogen at an initial pressure of 1 MPa.

The contents in the autoclave were heated at 180° C. or 200° C. for 1 hour. After this heat treatment, it was found that the sawdust was adequately decomposed and kerosene separated out. The contents were filtered to separate solids from oil. The amount of oil was weighed.

A series of experiments was carried out to determine the maximum amount of oil that can be absorbed by the sawdust. It was found that about 5 times as much oil as sawdust (by weight) is absorbed by sawdust. It was also found that the absorbed oil cannot be separated by simple filtration.

The ability of biomass to release absorbed oil after treatment is expressed in terms of "Rate of liquid separation" (%) calculated from the following equation.

$$\text{Rate of liquid separation} = \frac{W - (1785 - 292 \times 5)}{292 \times 5} \times 100\%$$

where, W denotes the weight of filtrate obtained after treatment, "292×5" denotes the maximum amount of kerosene that can be absorbed into the sawdust, and "1785−292× 5" denotes the amount of kerosene which remains in the liquid phase without being absorbed into the sawdust before treatment.

The result of experiments is shown in Table 1.

TABLE 1

| | Temperature of treatment | |
| --- | --- | --- |
| | 180° C. | 200° C. |
| Rate of liquid separation | 39.4% | 47.8% |

This result proves that the method of the present invention permits economical disposal of plant-derived biomass by decomposition with heating under pressure (the second step for modifying biomass) and subsequent efficient oil recovery from the decomposed biomass.

Example 2

A 15-liter autoclave was charged with 1.4 kg of sawdust of New Zealand pine and 5.38 kg of kerosene. The contents were kept at 150-180° C. under a pressure of 0.3 MPa for 1 hour, so that the sawdust was dried. (Sample 1)

A portion (500 g) of the dried biomass in slurry form was placed in a 5-liter autoclave, and it was heated at 250° C. for 1 hour under a pressure of 1 MPa (initial) to 1.7 MPa. (Sample 2)

The samples 1 and 2 (both in slurry form) were centrifuged for separation between oil and dried biomass. The separated components were weighed. The samples were also dried by hot air. The dried samples were weighed. Table 2 shows the relative weight of the centrifuged sample, with the weight of the hot-air dried sample being 100.

TABLE 2

| | Sample 1 | Sample 2 |
| --- | --- | --- |
| Relative weigh of centrifuged sample | 110 | 104 |
| Relative weight of hot-air dried sample | 100 | 100 |

Centrifugal separation: 1000 rpm for 10 minutes

Hot-air drying: at 150° C. for 10 hours

It is apparent from the foregoing result that the recovery of oil from the slurry of biomass modified after drying is better than that from the slurry of simply dried biomass.

Figure 5:
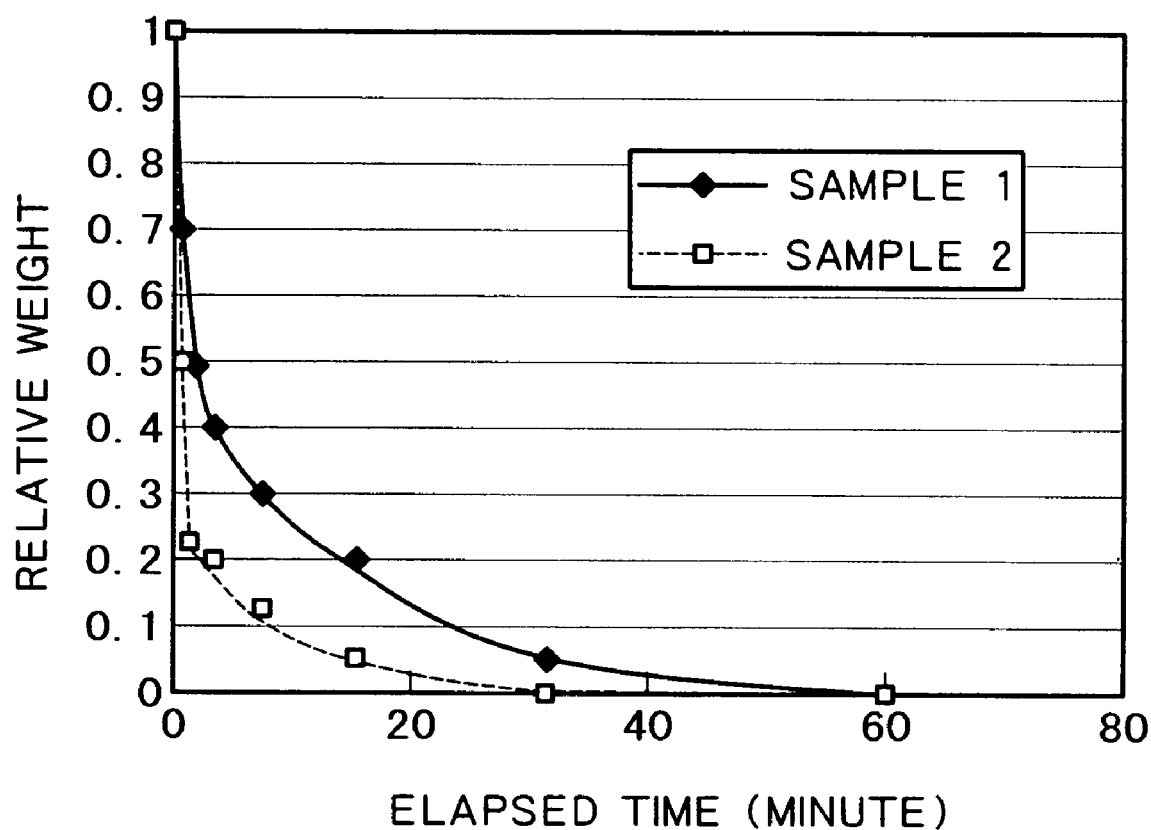
FIG. 5 is a diagram showing the rate of oil removal from biomass.

The centrifuged samples 1 and 2 were underwent thermogravimetry at 180° C. in a nitrogen stream to measure the relative weight of the sample at certain intervals. The change in the relative weight represents the rate of oil removal. The result is shown in FIG. 5.

This result proves that sample 2, which has undergone the modifying treatment according to the present invention, permits oil to be removed more easily.

[Effect of the Invention]

According to the present invention, it is possible to dry plant-derived biomass efficiently and economically without impairing its value as a fuel. The dried biomass with partial decomposition can be readily added to coal and heavy oil. It is useful as a constituent of biomass fuel that can be easily ignited.

The method for drying biomass and the method for producing biomass fuel make it possible to reuse the plant-derived biomass which cannot be easily disposed of by the conventional technology. Therefore, the present invention is of great industrial value.

What is claimed is:

1. A method for drying plant-derived biomass, said method comprising:
   (a) a step of grinding plant-derived biomass,
   (b) a step of treating the ground product of biomass in oil at 120-300° C. under a pressure which is higher than the vapor pressure of said oil at said temperature, and
   (c) a step of drying the ground product of biomass at 120-200° C.,
   with the sequence of steps (b) and (c) being arbitrary.

2. The method for drying as defined in claim 1, wherein the step (b) is followed by the step (c).

3. The method for drying as defined in claim 1, wherein the step (a) is carried out in oil.

4. The method for drying as defined in claim 1, wherein grinding is carried out such that the ground product of plant-derived biomass has an average particle size of 1-5 mm.

5. The method for drying as defined in claim 1, wherein the ground product of biomass is mixed with oil in a ratio of from 10:20 to 10:50 by weight.

6. The method for drying as defined in claim 1, which comprises an additional step of recovering for reuse the latent heat of evaporation of water vapor evolved in the step (c).

7. The method for drying as defined in claim 1, wherein step (b) results in partial decomposition of the plant-derived biomass.

8. The method for drying as defined in claim 1, wherein step (b) is carried out at a temperature between 200° C. and 270° C.

9. The method for drying as defined in claim 1, wherein step (b) is carried out at a pressure lower than 1 MPa.

10. The method for drying as defined in claim 1, wherein step (b) is carried out for 10-90 minutes.

11. A method for producing biomass fuel, said method comprising:
    (i) a step of grinding plant-derived biomass,
    (j) a step of treating the ground product of biomass in oil at 120-300° C. under a pressure which is higher than the vapor pressure of said oil at said temperature,
    (k) a step of adding a gasifying catalyst to the ground product of biomass; and
    (l) a step of drying the ground product of biomass at 120-200° C., with the sequence of steps (j) to (l) being arbitrary so long as step (k) precedes step (l).

12. A method for producing biomass fuel, said method comprising:
    (m) a step of grinding plant-derived biomass,
    (n) a step of treating the ground product of biomass in oil at 120-300° C. under a pressure which is higher than the vapor pressure of said oil at said temperature, and
    (o) a step of drying the ground product of biomass at 120-200° C., with the sequence of steps (n) and (o) being arbitrary.

13. The method for producing biomass fuel as defined in claim 12, which comprises an additional step of adding a gasifying catalyst, said additional step being carried out before the step (o).

14. A method for producing biomass fuel, said method comprising:
    (d) a step of grinding plant-derived biomass,
    (e) a step of producing a coal slurry from oil and coal,
    (f) a step of mixing the ground product of biomass with the coal slurry, and either the following steps (g) and (h), or steps (g') and (h'):
    (g) a step of treating the ground product of biomass in oil at 120-300° C. under a pressure which is higher than the vapor pressure of said oil at said temperature, and
    (h) a step of drying the ground product of biomass at 120-200° C.,
    with the sequence of steps (f) to (h) being arbitrary;
    (g') a step of treating the mixture in oil at 120-300° C. under a pressure which is higher than the vapor pressure of said oil at said temperature, and
    (h') a step of drying the mixture at 120-200° C., with the sequence of steps (g') to (h') being arbitrary.

15. The method for producing biomass fuel as defined in claim 14, wherein the coal is low-grade coal.

* * * * *